United States Patent
Nagaraj

(10) Patent No.: US 12,460,689 B2
(45) Date of Patent: Nov. 4, 2025

(54) BRAKE ASSEMBLY INCLUDING EXPANDABLE ROTOR

(71) Applicant: GM GLOBAL TECHNOLOGY OPERATIONS LLC, Detroit, MI (US)

(72) Inventor: Vinay Nagaraj, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 434 days.

(21) Appl. No.: 18/077,662

(22) Filed: Dec. 8, 2022

(65) Prior Publication Data

US 2024/0191761 A1 Jun. 13, 2024

(51) Int. Cl.
*F16D 65/12* (2006.01)
*F16D 55/00* (2006.01)
*F16D 65/02* (2006.01)

(52) U.S. Cl.
CPC .... *F16D 65/123* (2013.01); *F16D 2055/0075* (2013.01); *F16D 2065/132* (2013.01); *F16D 2065/1328* (2013.01); *F16D 2065/136* (2013.01); *F16D 2065/1376* (2013.01); *F16D 2065/138* (2013.01); *F16D 2065/1388* (2013.01); *F16D 2065/1392* (2013.01)

(58) Field of Classification Search
CPC ... F16D 65/123–127; F16D 2055/0075; F16D 2065/132; F16D 2065/136; F16D 2065/1328; F16D 2065/1376; F16D 2065/138; F16D 2065/1388; F16D 2065/1392
USPC ................................................ 188/218 XL
See application file for complete search history.

(56) References Cited

U.S. PATENT DOCUMENTS

| | | | | |
|---|---|---|---|---|
| 5,772,285 | A * | 6/1998 | Bigley | F16D 65/128 |
| | | | | 301/105.1 |
| 6,357,557 | B1 * | 3/2002 | Di Ponio | F16D 65/12 |
| | | | | 188/218 XL |
| 6,604,613 | B2 * | 8/2003 | Burgoon | F16D 65/12 |
| | | | | 188/218 XL |
| 7,654,365 | B2 * | 2/2010 | Lamb | F16D 65/12 |
| | | | | 188/218 XL |
| 11,428,283 | B2 * | 8/2022 | Matti | F16D 65/123 |
| 2009/0038895 | A1 * | 2/2009 | Snyder | F16D 65/12 |
| | | | | 188/218 XL |
| 2021/0317886 | A1 * | 10/2021 | Harrington | F16D 65/123 |

* cited by examiner

*Primary Examiner* — Christopher P Schwartz

(57) ABSTRACT

A brake assembly including a rotor defining an aperture. An axis of rotation of the brake assembly extends through a center of the aperture. A spindle is within the aperture. The spindle is in cooperation with the rotor to restrict independent rotation of the rotor and the spindle about the axis of rotation, restrict axial movement of the rotor relative to the spindle along the axis of rotation, and accommodate radial expansion of the rotor in a plane perpendicular to the axis of rotation.

17 Claims, 4 Drawing Sheets

BRAKE ASSEMBLY INCLUDING EXPANDABLE ROTOR

INTRODUCTION

The information provided in this section is for the purpose of generally presenting the context of the disclosure. Work of the presently named inventor, to the extent it is described in this section, as well as aspects of the description that may not otherwise qualify as prior art at the time of filing, are neither expressly nor impliedly admitted as prior art against the present disclosure.

The present disclosure relates to brake assemblies, and more particularly to a brake assembly including an expandable rotor that reduces, or eliminates, thermal coning.

During vehicle braking, brake pads clamp onto a disc of a brake assembly. Friction between the brake pads and the disc slows rotation of the wheels of the vehicle, and converts kinetic energy into thermal energy. The thermal energy heats the disc, which causes the disc to expand. The disc is rigidly mounted to a hat of the brake assembly. Because the disc cannot expand freely in a radial direction, the disc may experience thermal coning when heated.

SUMMARY

In a feature, a brake assembly includes: a rotor defining an aperture, an axis of rotation of the brake assembly extends through a center of the aperture; and a spindle within the aperture, the spindle in cooperation with the rotor to restrict independent rotation of the rotor and the spindle about the axis of rotation, restrict axial movement of the rotor relative to the spindle along the axis of rotation, and accommodate radial expansion of the rotor in a plane perpendicular to the axis of rotation.

In further features, a retention member overlaps an interface between the spindle and the rotor to restrict axial movement of the rotor relative to the spindle along the axis of rotation.

In further features, the retention member is a retention ring affixed to the spindle with a fastener.

In further features, the rotor includes a rotor flange defining the aperture; the spindle includes a spindle flange abutting the rotor flange; cooperation between the rotor flange and the spindle flange restricts axial movement of the rotor relative to the spindle along the axis of rotation; and the rotor flange slides along the spindle flange outward from the axis of rotation in response to radial expansion of the rotor when the rotor is heated.

In further features, a retention member overlaps an interface between the rotor flange and the spindle flange, the rotor flange is between the retention member and the spindle flange.

In further features, the rotor includes alternating rotor recesses and rotor ridges defining the aperture; the spindle includes alternating spindle recesses and spindle ridges around an outer periphery of the spindle; and each one of the spindle recesses cooperates with one of the rotor ridges, and each one of the spindle ridges cooperates with one of the rotor recesses, so that the rotor rotates with the spindle.

In further features, a retention ring overlaps the spindle recesses and the rotor ridges.

In further features, the spindle includes a spindle base and a spindle sleeve at a center of the spindle base, the spindle sleeve defines a spindle bore including internal splines configured to cooperate with an axle of a vehicle, the axis of rotation of the brake assembly extends through the spindle bore.

In further features, the spindle sleeve includes a sleeve flange, the sleeve flange configured to retain a bearing on the spindle sleeve.

In a feature, a brake assembly includes: a rotor including a rotor flange defining an aperture, an axis of rotation of the brake assembly extends through a center of the aperture; and a spindle within the aperture, the spindle in cooperation with the rotor to restrict independent rotation of the rotor and the spindle about the axis of rotation. The spindle includes a spindle base including a spindle flange in cooperation with, and overlapping, the rotor flange; and a spindle sleeve at a center of the spindle base, the spindle sleeve defining a spindle bore, the axis of rotation of the brake assembly extends through the spindle bore. Cooperation between the rotor flange and the spindle flange restricts axial movement of the rotor relative to the spindle along the axis of rotation, and accommodates radial expansion of the rotor in a plane perpendicular to the axis of rotation by allowing the rotor flange to slide along the spindle flange outward from the axis of rotation in response to the rotor being heated.

In further features, a retention member overlaps the rotor flange and the spindle flange to restrict axial movement of the rotor relative to the spindle along the axis of rotation. The rotor flange is between the spindle flange and the retention member.

In further features, the retention member is a retention ring affixed to the spindle base with a plurality of fasteners extending through the spindle base, the plurality of fasteners configured to mount a wheel to the brake assembly.

In further features, the rotor flange extends along alternating rotor recesses and rotor ridges defining the aperture; the spindle flange extends along alternating spindle recesses and spindle ridges of the spindle base; and each one of the spindle recesses cooperates with one of the rotor ridges, and each one of the spindle ridges cooperates with one of the rotor recesses, so that the rotor rotates with the spindle.

In further features, a retention ring overlaps the spindle recesses and the rotor ridges.

In further features, the rotor includes an outer cheek, an inner cheek, and a plurality of vanes between the outer cheek and the inner cheek. The rotor flange, the rotor ridges, and the rotor recesses are included with the outer cheek.

In further features, the spindle sleeve includes a sleeve flange at an inner end thereof, the sleeve flange configured to retain a bearing on the spindle sleeve.

In a feature a brake assembly includes: a rotor including an outer cheek, an inner cheek, and a plurality of vanes between the outer cheek and the inner cheek; a cheek flange included with the outer cheek, the cheek flange defining an aperture, the cheek flange extending along alternating cheek recesses and cheek ridges at the aperture, an axis of rotation of the brake assembly extends through a center of the aperture; a spindle within the aperture, the spindle defining a spindle bore, the spindle including a spindle flange in cooperation with the cheek flange to restrict axial movement of the rotor relative to the spindle along the axis of rotation in a first direction, the spindle flange extending along alternating spindle recesses and spindle ridges, the spindle recesses cooperate with the cheek ridges and the spindle ridges cooperate with the cheek recesses to restrict independent rotation of the rotor and the spindle about the axis of rotation; and a retention member overlapping the spindle recesses and the cheek ridges to restrict axial movement of the rotor relative to the spindle along the axis of rotation in a second direction that is opposite to the first direction, the cheek flange is between the retention member and the spindle flange.

In further features, the retention member is a retention ring secured to the spindle with fasteners configured to fasten a wheel to the brake assembly.

In further features, the spindle includes a spindle sleeve defining the spindle bore, the spindle sleeve including a sleeve flange configured to retain a bearing on the spindle sleeve.

In further features, the spindle sleeve includes a plurality of splines therein.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
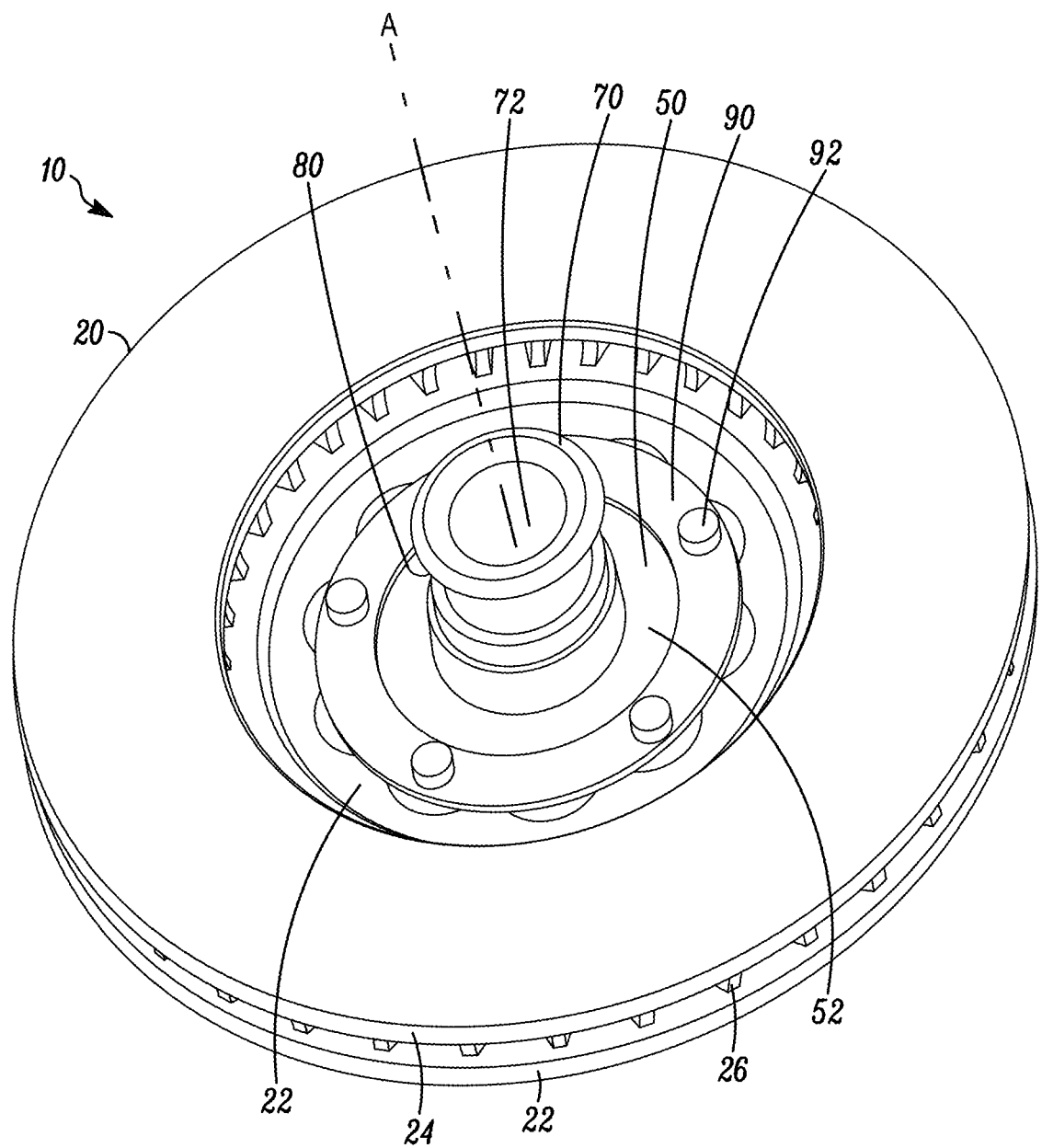
FIG. 1 is a perspective view of an exemplary brake assembly in accordance with the present disclosure.
Figure 2:
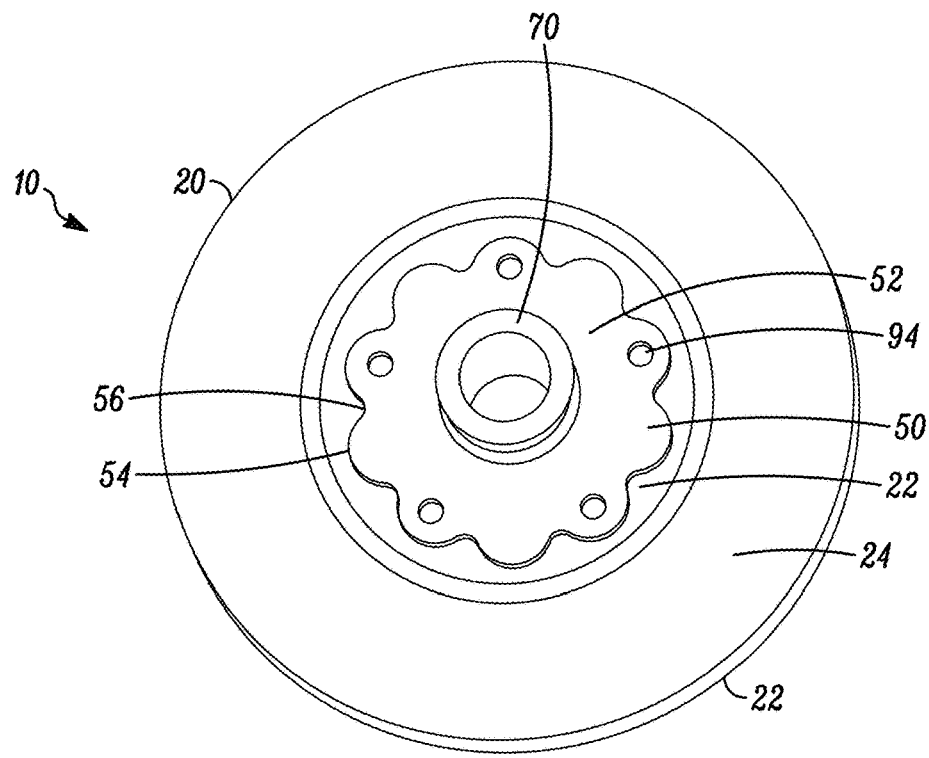
FIG. 2 is another perspective view of the brake assembly of FIG. 1, but with a retention member removed.

FIGS. 1 and 2 illustrate an exemplary brake assembly 10 in accordance with the present disclosure. The brake assembly 10 is configured to be installed on any suitable vehicle as part of a disc brake system for slowing and stopping the vehicle. The brake assembly 10 may also be configured for use with any suitable non-vehicular braking system as well. The present disclosure thus relates to both vehicular and non-vehicular applications.

The brake assembly 10 generally includes a rotor 20 and a spindle 50. The rotor 20 includes an outer cheek 22 and an inner cheek 24. The outer cheek 22 is in direct cooperation with the spindle 50, as described further herein, and the inner cheek 24 is spaced apart from the spindle 50. Between the outer cheek 22 and the inner cheek 24 are a plurality of vanes 26. The outer cheek 22, the inner cheek 24, and the vanes 26 together provide a disc of the brake assembly 10. During braking, brake pads clamp onto the outer cheek 22 and the inner cheek 24 to slow rotation of the rotor 20, which slows rotation of a wheel mounted to the brake assembly 10.

Figure 3:
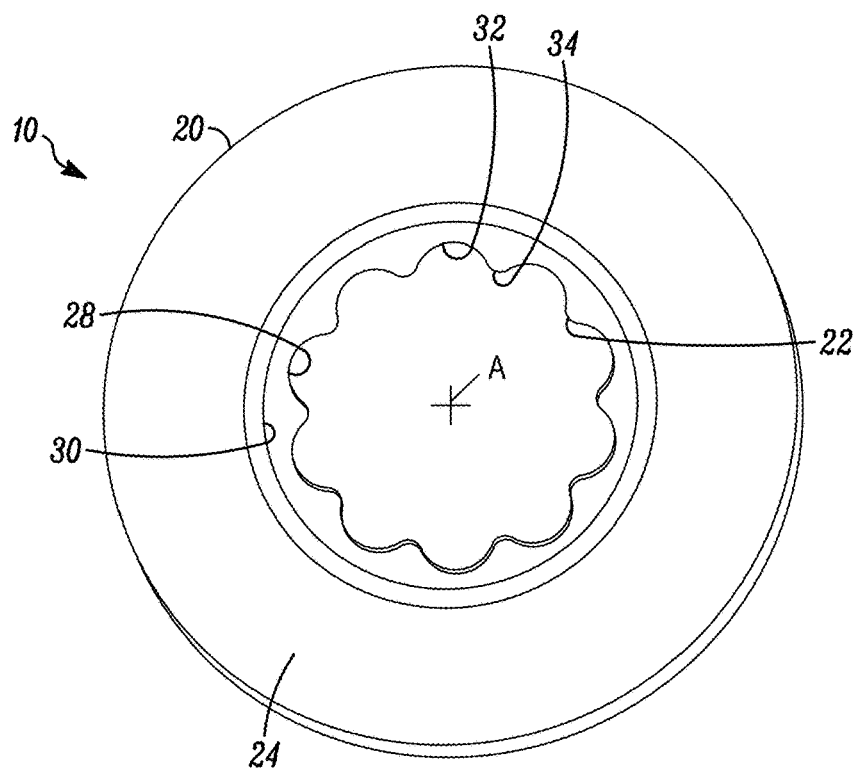
FIG. 3 is an additional perspective view of the brake assembly of FIG. 1, but with a spindle removed.
Figure 4:
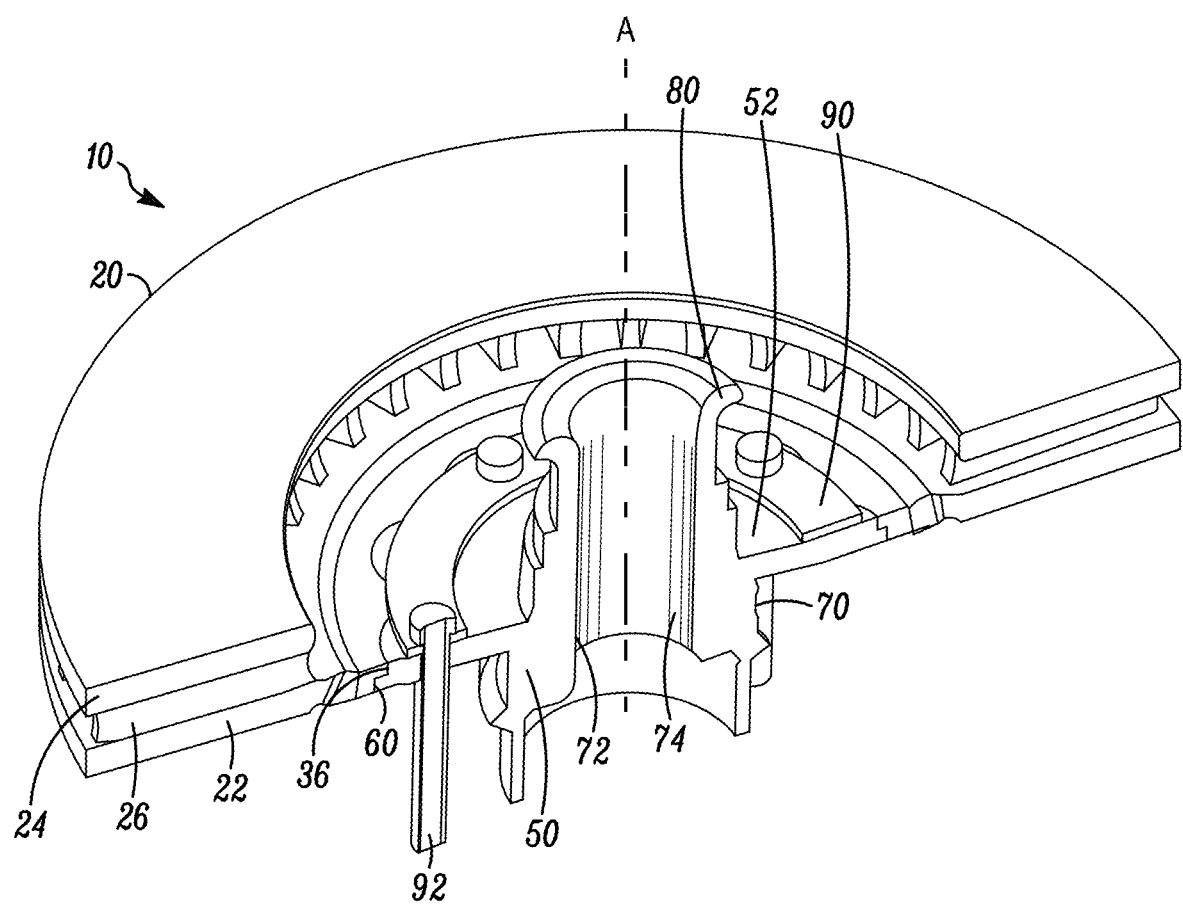
FIG. 4 is a cross-sectional view of the brake assembly of FIG. 1.
Figure 5:
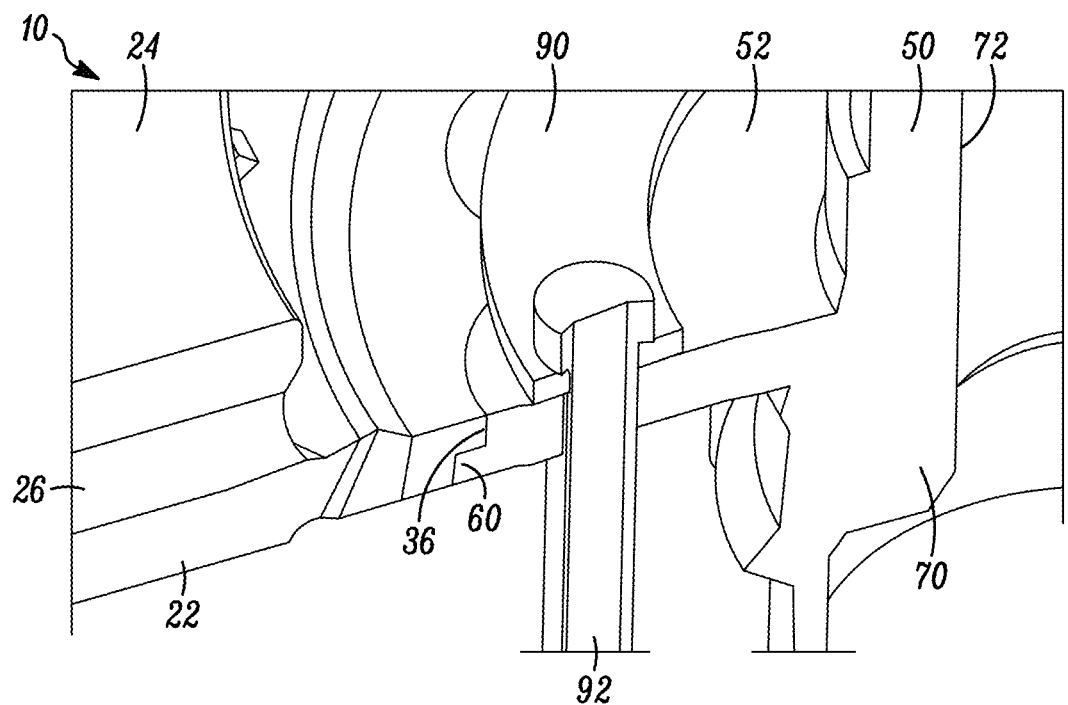
FIG. 5 is a detailed view of an area of FIG. 4.
Figure 6:
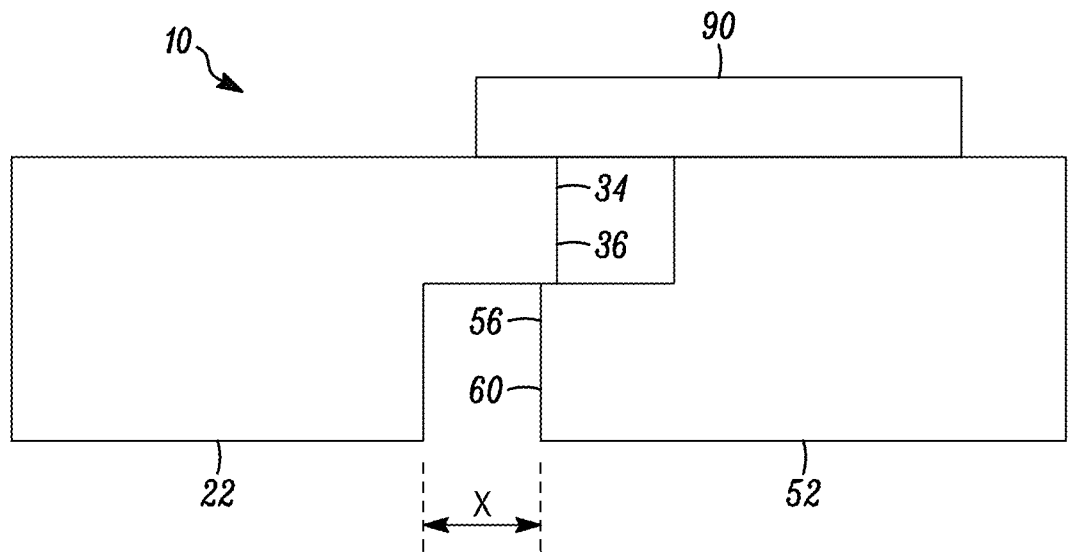
FIG. 6 is another cross-sectional view of the brake assembly of FIG. 1 illustrating radial expansion of a rotor from the spindle.

With additional reference to FIG. 3, the outer cheek 22 defines an outer aperture 28, and the inner cheek 24 defines an inner aperture 30. An axis of rotation A of the brake assembly 10 extends through a center of both the outer aperture 28 and the inner aperture 30. The outer cheek 22 includes a plurality of alternating cheek recesses 32 and cheek ridges 34 (also referred to as rotor recesses and rotor ridges), which define the outer aperture 28. The outer cheek 22 further includes a cheek flange 36 (also referred to as a rotor flange), which extends along each of the cheek recesses 32 and the cheek ridges 34, as illustrated in FIGS. 4-6. Thus, the cheek flange 36 also defines the outer aperture 28. The cheek recesses 32 and the cheek ridges 34 are sized and shaped to cooperate with the spindle 50 so that the spindle 50 and the rotor 20 rotate together about the axis of rotation A, as described further herein. The cheek recesses 32 and cheek ridges 34 may have any other suitable shape and size, or be configured in any other suitable manner, to cooperate with the spindle 50 so that the rotor 20 rotates with the spindle 50. The outer cheek 22 is not rigidly fastened to the spindle 50 to allow the rotor 20 to radially expand outward from the spindle 50 when heated.

The spindle 50 sits in the outer aperture 28 and the inner aperture 30 of the outer cheek 22 and the inner cheek 24 respectively. The spindle 50 includes a spindle base 52, which defines a plurality of spindle ridges 54 and spindle recesses 56 (see FIG. 2, for example). The spindle ridges 54 and the spindle recesses 56 alternate around an outer circumference of the spindle base 52. Also at the outer circumference of the spindle base 52 is a spindle flange 60, as illustrated in FIGS. 4-6. The spindle flange 60 extends around the outer circumference of the spindle base 52 along the spindle ridges 54 and the spindle recesses 56.

The spindle ridges 54 and the spindle recesses 56 are sized and shaped to cooperate with the cheek recesses 32 and the cheek ridges 34 respectively. Cooperation between the spindle ridges 54 and the cheek recesses 32, and cooperation between the spindle recesses 56 and the cheek ridges 34, locks the rotor 20 and the spindle 50 together so that the rotor 20 and the spindle 50 rotate together about the axis of rotation A even as the rotor 20 expands radially outward from the axis of rotation A when the rotor 20 is heated. The spindle flange 60 abuts the cheek flange 36 to restrict axial movement of the rotor 20 relative to the spindle 50 in a direction parallel to the axis of rotation A, and to accommodate radial expansion of the rotor 20 in a plane perpendicular to the axis of rotation A, as explained further herein.

The spindle 50 further includes a spindle sleeve 70, as illustrated in FIGS. 1, 2, 4, and 5. The spindle sleeve 70 is at a center of the spindle base 52, and defines a spindle bore 72 through which the axis of rotation A extends. Within the spindle bore 72 are a plurality of splines 74, as illustrated in FIG. 4. The spindle sleeve 70 further includes a sleeve flange 80 at an inner end of the sleeve 70. The sleeve flange 80 is configured to retain a bearing on an outer surface of the sleeve 70 between the sleeve flange 80 and the spindle base 52. In vehicle applications, the bearing is between the outer surface of the sleeve 70 and a hub for connecting the brake assembly 10 to a knuckle.

The brake assembly 10 further includes a retention member 90, as illustrated in FIGS. 1 and 4-6. The retention member 90 restricts axial movement of the rotor 20 along the axis of rotation A towards the sleeve flange 80. The retention member 90 may be a ring, as illustrated, or any other fastener of any shape and configuration suitable for restricting axial movement of the rotor 20.

In the example illustrated, the retention member 90 is fastened to the spindle base 52 with fasteners 92 extending through apertures 94 defined by the spindle base 52. The fasteners 92 are further configured to cooperate with a wheel for mounting a wheel to the brake assembly 10. The retention member 90 overlaps each of the cheek ridges 34 and the spindle recesses 56. With reference to FIG. 6, for example, the retention member 90 also overlaps portions of the cheek flange 36 and the spindle flange 60 that extend along the cheek ridges 34 and the spindle recesses 56.

In the areas where the cheek ridges 34 mate with the spindle recesses 56, the cheek flange 36 is between the spindle flange 60 and the retention member 90, as illustrated in FIG. 6. Thus, cooperation between the cheek flange 36 and the spindle flange 60 restricts axial movement of the rotor 20 along the axis of rotation A outward in a direction away from the sleeve flange 80. Cooperation between the cheek flange 36 and the retention member 90 restricts axial movement of the rotor 20 along the axis of rotation A towards the sleeve flange 80.

During braking, friction between the rotor 20 and brake pads held by brake calipers slows the rotor 20, and slows a wheel mounted to the brake assembly 10 by way of the fasteners 92. The friction converts kinetic energy into thermal energy, which heats the outer cheek 22 and the inner cheek 24. When heated, the outer cheek 22 and the inner cheek 24 expand radially outward from the spindle 50 in a plane perpendicular to the axis of rotation A. Because the outer cheek 22 and the inner cheek 24 are not rigidly mounted to the spindle 50, the outer and inner cheeks 22, 24 are free to radially expand.

FIG. 6 illustrates the outer cheek 22 in an expanded state in response to being heated during braking. In the example of FIG. 6, the outer cheek 22 has expanded radially outward a distance X from the spindle base 52 in a plane perpendicular to the axis of rotation A. As the outer cheek 22 expands radially, the cheek flange 36 slides outward along the spindle flange 60. The length of the cheek flange 36 and the length of the spindle flange 60 are such that at maximum radial expansion of the outer cheek 22 (and the overall rotor 20), the cheek flange 36 and the spindle flange 60 still overlap and are in cooperation with one another to restrict axial movement of the rotor 20 along the longitudinal axis A in a direction away from the sleeve flange 80. Also, at maximum radial expansion of the outer cheek 22 (and the overall rotor 20), the cheek ridges 34 remain beneath the retention member 90 to restrict axial movement of the rotor 20 along the longitudinal axis A towards the sleeve flange 80. Still further, at maximum radial expansion of the outer cheek 22 (and the overall rotor 20), the spindle ridges 54 and the spindle recesses 56 cooperate with the cheek recesses 32 and the cheek ridges 34 respectively so that the rotor 20 and the spindle 50 rotate together about the axis of rotation A.

Prior to the present disclosure, brake rotors were rigidly fastened to a wheel through a hat in a manner that would not allow the rotor to radially expand outward when heated. As a result, the cheeks would bend and warp up or down out of a plane extending perpendicular to the axis of rotation A. This condition, also known as thermal coning, often resulted in excess wear on brake pads, and caused brake judder. The present disclosure reduces or eliminates thermal coning by not rigidly securing the rotor 20 to the spindle 50, thereby allowing the rotor 20 (including the outer cheek 22 and the inner cheek 24) to expand radially in a plane perpendicular to the axis of rotation A when heated. The present disclosure also reduces, or eliminates, uneven brake pad wear.

The present disclosure eliminates the brake hat. Eliminating the brake hat reduces the mass of the brake assembly 10 by about 25%, thereby reducing material costs and improving overall performance of the brake assembly 10. By not rigidly mounting the rotor 20 to the spindle 50 by way of a brake hat, overall stiffness of the brake assembly 10 is reduced, particularly at the interface between the rotor 20 and the spindle 50, which may further reduce noise and vibration.

The brake assembly 10 facilitates repair and/or replacement of components of the brake assembly 10, as well as any associated components. For example, the rotor 20 may be decoupled from the spindle 50 and replaced, without having to uninstall or replace the entire brake assembly 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A brake assembly comprising:
   a rotor defining an aperture, an axis of rotation of the brake assembly extends through a center of the aperture; and
   a spindle within the aperture, the spindle in cooperation with the rotor to restrict independent rotation of the rotor and the spindle about the axis of rotation, restrict axial movement of the rotor relative to the spindle along the axis of rotation, and accommodate radial expansion of the rotor in a plane perpendicular to the axis of rotation, wherein:
the rotor includes alternating rotor recesses and rotor ridges defining the aperture;
the spindle includes alternating spindle recesses and spindle ridges around an outer periphery of the spindle; and
each one of the spindle recesses cooperates with one of the rotor ridges and each one of the spindle ridges cooperates with one of the rotor recesses so that the rotor rotates with the spindle.

2. The brake assembly of claim 1, further comprising a retention member overlapping an interface between the spindle and the rotor to restrict axial movement of the rotor relative to the spindle along the axis of rotation.

3. The brake assembly of claim 2, wherein the retention member is a retention ring affixed to the spindle with a fastener.

4. The brake assembly of claim 1, wherein:
the rotor includes a rotor flange defining the aperture;
the spindle includes a spindle flange abutting the rotor flange;
cooperation between the rotor flange and the spindle flange restricts axial movement of the rotor relative to the spindle along the axis of rotation; and
the rotor flange slides along the spindle flange outward from the axis of rotation in response to radial expansion of the rotor when the rotor is heated.

5. The brake assembly of claim 4, further comprising a retention member overlapping an interface between the rotor flange and the spindle flange, the rotor flange is between the retention member and the spindle flange.

6. The brake assembly of claim 1, wherein the spindle includes a spindle base and a spindle sleeve at a center of the spindle base, the spindle sleeve defines a spindle bore including internal splines configured to cooperate with an axle of a vehicle, the axis of rotation of the brake assembly extends through the spindle bore.

7. The brake assembly of claim 6, wherein the spindle sleeve includes a sleeve flange.

8. The brake assembly of claim 1, further comprising a retention ring overlapping the spindle recesses and the rotor ridges.

9. A brake assembly comprising:
a rotor including a rotor flange defining an aperture, an axis of rotation of the brake assembly extends through a center of the aperture;
a spindle within the aperture, the spindle in cooperation with the rotor to restrict independent rotation of the rotor and the spindle about the axis of rotation, the spindle including:
a spindle base including a spindle flange in cooperation with, and overlapping, the rotor flange; and
a spindle sleeve at a center of the spindle base, the spindle sleeve defining a spindle bore, the axis of rotation of the brake assembly extends through the spindle bore; and
a retention member overlapping the rotor flange and the spindle flange to restrict axial movement of the rotor relative to the spindle along the axis of rotation, the rotor flange is between the spindle flange and the retention member;
wherein:
cooperation between the rotor flange and the spindle flange restricts axial movement of the rotor relative to the spindle along the axis of rotation, and accommodates radial expansion of the rotor in a plane perpendicular to the axis of rotation by allowing the rotor flange to slide along the spindle flange outward from the axis of rotation in response to the rotor being heated; and
the retention member is a retention ring affixed to the spindle base with a plurality of fasteners extending through the spindle base, the plurality of fasteners configured to mount a wheel to the brake assembly.

10. The brake assembly of claim 9, wherein:
the rotor flange extends along alternating rotor recesses and rotor ridges defining the aperture;
the spindle flange extends along alternating spindle recesses and spindle ridges of the spindle base; and
each one of the spindle recesses cooperates with one of the rotor ridges, and each one of the spindle ridges cooperates with one of the rotor recesses, so that the rotor rotates with the spindle.

11. The brake assembly of claim 10, further comprising a retention ring overlapping the spindle recesses and the rotor ridges.

12. The brake assembly of claim 10, wherein the rotor includes an outer cheek, an inner cheek, and a plurality of vanes between the outer cheek and the inner cheek; and
wherein the rotor flange, the rotor ridges, and the rotor recesses are included with the outer cheek.

13. The brake assembly of claim 9, wherein the spindle sleeve includes a sleeve flange at an inner end thereof.

14. A brake assembly comprising:
a rotor including an outer cheek, an inner cheek, and a plurality of vanes between the outer cheek and the inner cheek;
a cheek flange included with the outer cheek, the cheek flange defining an aperture, the cheek flange extending along alternating cheek recesses and cheek ridges at the aperture, an axis of rotation of the brake assembly extends through a center of the aperture;
a spindle within the aperture, the spindle defining a spindle bore, the spindle including a spindle flange in cooperation with the cheek flange to restrict axial movement of the rotor relative to the spindle along the axis of rotation in a first direction, the spindle flange extending along alternating spindle recesses and spindle ridges, the spindle recesses cooperate with the cheek ridges and the spindle ridges cooperate with the cheek recesses to restrict independent rotation of the rotor and the spindle about the axis of rotation; and
a retention member overlapping the spindle recesses and the cheek ridges to restrict axial movement of the rotor relative to the spindle along the axis of rotation in a second direction that is opposite to the first direction, the cheek flange is between the retention member and the spindle flange.

15. The brake assembly of claim 14, wherein the spindle further includes a spindle sleeve defining the spindle bore, the spindle sleeve including a sleeve flange configured to retain a bearing on the spindle sleeve.

16. The brake assembly of claim 15, wherein the spindle sleeve includes a plurality of splines therein.

17. The brake assembly of claim 14, wherein the retention member is a retention ring secured to the spindle with fasteners configured to fasten a wheel to the brake assembly.

* * * * *